United States Patent [19]

Peterson et al.

[11] Patent Number: 5,195,887
[45] Date of Patent: Mar. 23, 1993

[54] REMEDIATION OF HYDROCARBONS FROM SOILS, SAND AND GRAVEL

[76] Inventors: Charles R. Peterson, 4575 Cornetts Rd., Catheys Valley, Calif. 95306; Gregory M. Peterson, 5265 Laguna Ct., Byron, Calif. 94514; Daniel C. Hopper, 7775 Pebble Dr., Kingman, Ariz. 86401; Trudy J. Weichlein, P.O. Box 154, Cathey's Valley, Calif. 95306

[21] Appl. No.: 756,855

[22] Filed: Sep. 10, 1991

[51] Int. Cl.$^5$ .............................................. F23G 5/20
[52] U.S. Cl. ..................... 432/14; 110/236; 110/246; 110/222; 110/346; 432/105; 432/111
[58] Field of Search ............... 110/236, 246, 226, 346, 110/229, 222; 432/14, 13, 105, 111

[56] References Cited

U.S. PATENT DOCUMENTS

| | | |
|---|---|---|
| 4,232,614 | 11/1980 | Fitch et al. . |
| 4,357,152 | 11/1982 | Duske et al. . |
| 4,361,100 | 11/1982 | Hinger . |
| 4,429,643 | 2/1984 | Mulholland . |
| 4,487,372 | 12/1984 | Deve . |
| 4,573,417 | 3/1986 | Deve . |
| 4,583,468 | 4/1986 | Reed et al. . |
| 4,615,283 | 10/1986 | Ciliberti et al. . |
| 4,667,609 | 5/1987 | Hardison et al. . |
| 4,748,921 | 6/1988 | Mendenhall . |
| 4,815,398 | 3/1989 | Keating, II et al. . |
| 4,889,484 | 12/1989 | Przewalski . |
| 4,945,839 | 8/1990 | Collette . |
| 4,951,417 | 8/1990 | Gerken et al. . |
| 4,957,429 | 9/1990 | Mendenhall . |
| 4,958,578 | 9/1990 | Houser ............................ 110/246 |
| 4,974,529 | 12/1990 | Benoit et al. .................. 110/246 |
| 5,020,452 | 6/1991 | Rybak . |
| 5,027,721 | 7/1991 | Anderson . |

OTHER PUBLICATIONS

Oct. 29, 1986, In Situ Treatment for Site Remediation by Richard Baker et al.
May 1990, Soil Remediation Techniques at Uncontrolled Hazardous Waste Sites by Ronald C. Sims.

*Primary Examiner*—Henry C. Yuen
*Attorney, Agent, or Firm*—Albert P. Halluin

[57] ABSTRACT

A high throughput apparatus and process for thermal remediation of soil contaminated with volatile organic compounds has a dryer with a high capacity heat source to volatilize and combust the compounds contained in a first lot of soil. The remediated soil is discharged and cooled. Hot gases and fines formed are drawn into a second dryer with an ignition source where a second lot of soil is used to cool the hot gases/fines mixture. A particulate control chamber is used to remove at least 75% of the fines from the gas/fines mixture. Gases containing uncombusted volatile organic compounds are directed back to the primary dryer for additional exposure to heat in order to complete combustion. Additional separation of the fines from gases is achieved in a baghouse.

12 Claims, 2 Drawing Sheets

REMEDIATION OF HYDROCARBONS FROM SOILS, SAND AND GRAVEL

BACKGROUND OF THE INVENTION

1. Field of the Invention

The present invention relates to a method and apparatus for the removal of volatile contaminants in soil. Specifically, the present invention relates to a method and apparatus for performing high speed, high capacity soil remediation at a site where the soil is contaminated with volatile compounds. Most particularly, the present invention relates to a method and apparatus for achieving thermal remediation of various soil mixtures contaminated with volatile hydrocarbon compounds.

2. Description of the Related Art

Hydrocarbon contamination of soils, gravel and sand is a worldwide environmental problem. Because of the potential for evaporation of the contaminants into the air and leaching into the local ground water supply, safe, efficient and complete removal techniques of hydrocarbons are needed.

The problem of decontamination of sites where hydrocarbons such as gasoline, jet fuels, and oils have been spilled and absorbed into the ground is complicated by not only the variety of hydrocarbon contaminants possible, but the characteristics of the surrounding environment where cleanup is desirable or necessary. Soil compositions are typically multi-phase and generally include nitrogen and oxygen, water, clays, dirt, rocks, and sand (i.e., small rocks and silicon dioxide grains). Therefore, distribution of the volatile organic compounds and other contaminants in gravel, sand or soil, and mixtures thereof, herein referred to collectively as "soil", depends on the varying volumetric composition of the soil. Consequently, within a given lot of multi-phase soil, the contaminants are distributed according to the permeability and uniformity of the soil and the chemical and physical relationship between the contaminants and the soil as described by the appropriate distribution coefficients.

One means for decontaminating or remediating soil containing hydrocarbon or other contaminants is by combustion of the contaminants by exposure to a high temperature environment, processes generally referred to as thermal remediation. Such a high temperature environment, ranging from as low as about 500° F. to 2000° F. (260° C. to 1093° C.) more, may be created in a variety of ways including direct exposure of the contaminated soil to an infrared radiation source or, more simply, a flame. Contaminated soil may also be heated indirectly, for example, by a heat exchange relation where the soil is isolated from a hot oil or hot gas.

Heating the contaminated soil to high temperatures tends to insure that all hydrocarbon contaminants contained therein are combusted, thereby decontaminating the soil. Heating the contaminated soil to relatively low temperatures, e.g., about 400° F. (204° C.) or less, may require multiple recirculations of the soil to prolong exposure to the heated environment and maximize the amount of hydrocarbons combusted.

While higher temperatures can facilitate rapid and thorough combustion, enough heat can be generated thereby to raise the temperature of the soil to 600° F. (315° C.) or more. In addition, exhaust gases and entrained fine particulate species on "fines" produced as a result of combustion will be very hot. Generally, the hot gases and fines must be separated from the soil after the combustion steps since the soil has thereby been decontaminated and may be suitable, after cooling, for return to the worksite from which it was excavated.

Typical separation means known in the art include inertial separators, such as cyclone separators or baghouses. Ceramic filters are also known. Alternatively, fines entrained in the exhaust gases from the combustion step may be removed by using a scrubber or stripping column filled with a liquid or a gas to capture the particulate species. Columns filled with carbon may be used to adsorb fines based on organic residues. Such processes inherently introduce problems of proper selection and disposal of the liquid solvent or the carbon adsorbent containing the captured fines. In particular, the solvent or adsorbent used may depend on the particulate species involved. Finally, a gas use to strip the exhaust gases may require additional stripping treatment in order to remove the particulate species before the stripping gas itself may be disposed.

In addition, high temperatures of the gases and fines exhausted from the combustion step will impact the choice for the separation operation. For example, the exhaust gases and fines may be so hot that either conventional filters used in baghouse-type separators are burned or the liquid solvent may vaporize, precluding separation altogether.

As discussed above, a principal concern for remediation processes is the need for a high throughput capacity in order to quickly and efficiently treat the huge quantities of soil which are likely to be involved in a contaminated worksite before the soil is suitable for return to the environment. Some systems currently available for thermally remediating are described as being capable of processing up to about 120 tons per hour. But, high throughput is not merely a question of scaling up the components used in a remediation apparatus, since substantial reduction of the temperatures of the soil, gases and fines may be necessary before any can be reintroduced to the environment. Indeed, achievement of high throughput results from optimization of heat input to the soil, heat transfer from the soil, gases and fines, and equipment input and output capacities in light of the characteristics of the contaminated soil to be treated.

SUMMARY OF THE INVENTION

The problems and disadvantages of currently available thermal remediation processes and apparatuses fundamentally concern their inability to remediate vast quantities of contaminated soil rapidly and efficiently while simultaneously managing the thermal consequences of such a large scale operation. The process and apparatus of the present invention successfully regulate heat exchange in a manner which contributes to achievement of a high throughput.

Therefore, one aspect of the present invention is to provide a high capacity, high speed soil remediation process and an apparatus for carrying out the process.

A further aspect of the present invention is to provide a soil remediation process and an apparatus for carrying out the process which optimize the removal of volatile organic contaminants from the soil.

An additional aspect of the present invention is to provide a highly efficient and less expensive process and apparatus for carrying out the process as compared to other on-site remediation processes and apparatuses.

Another aspect of the present invention is to provide a highly versatile remediation process and an apparatus for carrying out the process in which operating parameters may be continuously monitored and adjusted as necessary to achieve the desired degree of cleanliness in the remediated soil and to accommodate soils with varying compositions and contamination levels.

An additional aspect of the present invention is to provide a soil remediation process and an apparatus for carrying out the process in which hot gases and fines generated thereby can be cooled rapidly before being substantially separated, thereby facilitating removal using conventional baghouse separation means.

A further aspect of the process and apparatus of the present invention is to provide a means for cooling hot gases and fines with soil prior to the separation of the gases and fines in the baghouse.

Other advantages and features of the process and apparatus of the present invention will be apparent from the following description provided herein.

These and other aspects of the present invention are provided in a process and apparatus in which a first lot of contaminated soil is heated. The volatile contaminants are volatilized and combusted, forming remediated soil, hot gases and fines. The hot gases and fines are cooled by contact with a second lot of soil, thereby preheating and remediating the latter. Any volatilized contaminants from the second lot are flashed off, forming additional gases and fines. The gases and fines are separated and before being returned to the environment, each is exposed to high temperatures to ensure that any remaining volatile contaminants are volatilized and combusted. The rapid and efficient remediation achieved by the process and apparatus described herein depends in part on the proper selection and use of uniformly sized soil components. Also significant is the composition of the lots of soil charged into the apparatus.

DETAILED DESCRIPTION OF THE INVENTION

Figure 1:
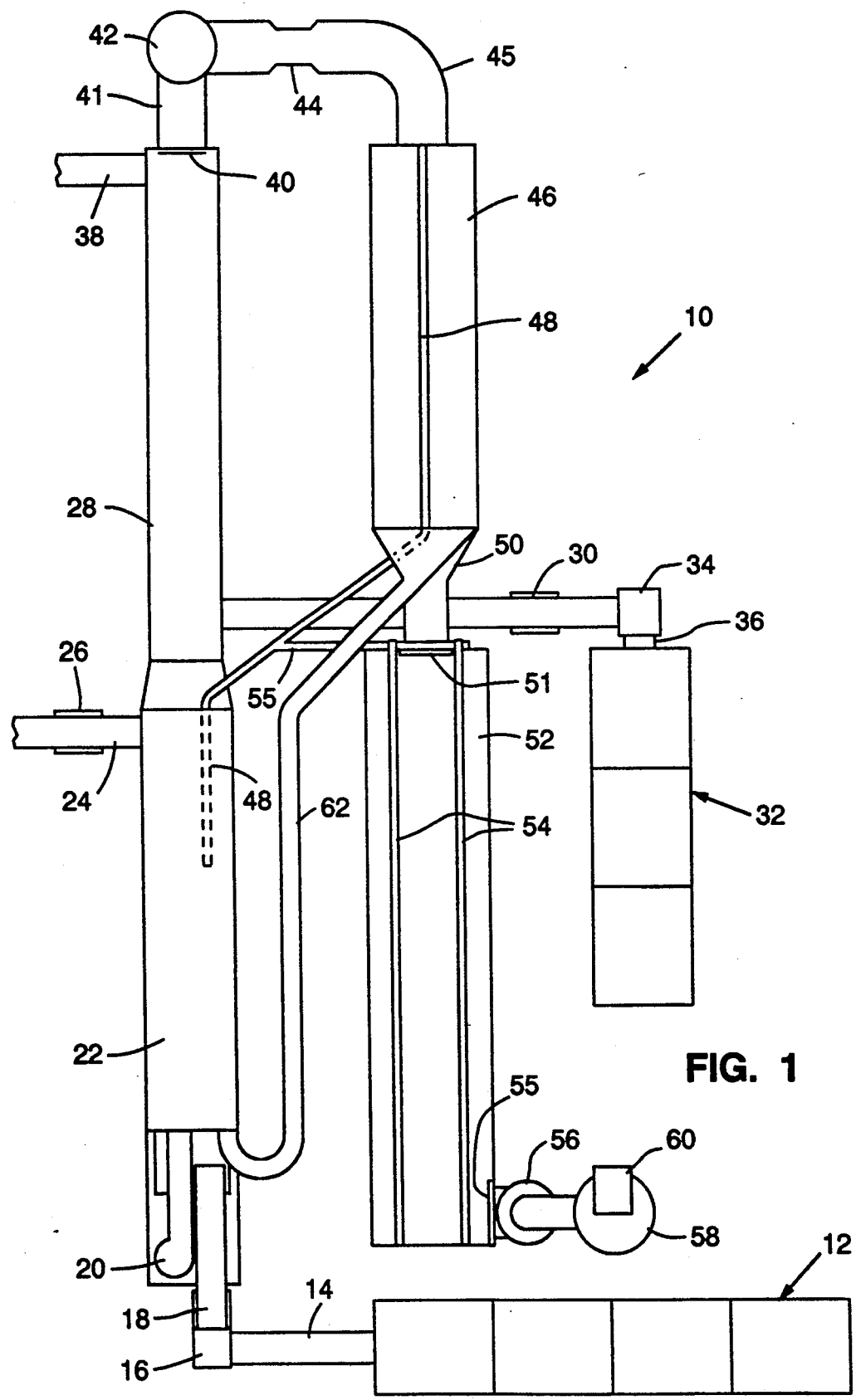
FIG. 1 is a plan view of the remediation apparatus of the present invention illustrating the physical relationship between various elements.

The remediation process and apparatus of the present invention are described in connection with FIGS. 1-4.

The process described herein provides a high speed, high throughput method for removing volatile contaminants from soil. The process is highly flexible with respect to the soil aggregates treated in terms of mixture, feed rate and temperature conditions suitable for complete combustion of the contaminants to relatively more innocuous compounds, like carbon dioxide and water. The apparatus 10 itself offers the advantages of lower cost both per ton of soil treated and with respect to more permanent facilities since it may be constructed using off-the-shelf components, easily transported to the worksite where the contaminated soil is located.

Contaminated bulk soil media, that is, soil components which have been excavated from the contaminated worksite, suitable for treatment in the apparatus 10 described herein, include aggregates of varying proportions of sand, gravel, rock, clay and dirt. Typically, contaminants include various volatile organic compounds (VOCs) like diesel fuels, fuel oils, gasolines, JP-4 jet fuel, JP-5 jet fuel, up to levels of about 60,000 parts/million (ppm) or more. Some moisture absorbed from ambient conditions may also be present in the soil, but soils with less than 4 wt % moisture facilitates processing at the highest rates. Higher moisture levels up to about 15 wt % may be managed at lower processing rates. The maximum moisture content capable of complete removal of volatile contaminants is a consideration in equipment selection.

The mixture introduced into the apparatus 10 is selected for thermal characteristics which optimize conditions within the apparatus 10 for volatilization and combustion of the VOCs. For example, introducing relatively more sand into the mixture will require more heat to maintain optimal operating temperatures during remediation. Conversely, introducing relatively more rock will require less heat to maintain optimum operating temperatures. Further, introducing more or less bulk media in general will lower or raise, respectively, the operating temperatures within the apparatus.

In addition, the size of the soil components themselves impacts the operating parameters of the remediation process. Generally, per unit weight, larger pieces require less heat than smaller pieces to reach a particular temperature. It is believed that this is due to the cooling of the smaller pieces which occurs as the VOCs are volatilized. Further, uniformity in size of the various soil components contributes to even heating and therefore to optimization of the remediation process. As a consequence, following the excavation of the soil components from the contaminated site, the soil components may require processing through conventional rock crushing equipment to yield individual pieces of particular sizes suitable for thermal remediation.

After crushing, the individual pieces may then be stockpiled according to size. For example, three-quarter inch and three-eighth inch pieces and smaller sand granules may be stored in separate feeder bins. Control of the composition of a given mixture charged into the apparatus from the feeder bins allows control of the temperature of the remediation process because of the particular thermal characteristics described above. In addition to having a major role in the control of the process, components in these sizes expedites compaction of the clean or remediated soil components (i.e., containing no measurable contaminants) after treatment in the remediation process when used to refill the excavated worksite.

Referring now to FIG. 1, the feed to the apparatus, contaminated bulk soil media, is loaded as a first lot into the apparatus from high capacity variable speed feeder bins 12. The capacity of individual feeder bins may vary up to 30 tons or more. The feeder bins may feature speed controls allowing control of the feed rate of a particular soil component and therefore of the distribution of the components within the mixture treated. A mixture of soil components is discharged from feeder bins 12 onto movable collector belt 14, over scalping screen 16 (to eliminate from the mixture pieces larger than a given size, for example, about one inch; rocks of this size or larger may damage certain pieces of equipment as they are transported through the apparatus) and onto inclined weigh belt 18. Weigh belt 18 allows determination of the weight of the soil components introduced into primary dryer 22 on an instantaneous basis as well as overall. From belt 18, the soil mixture enters primary dryer 22 adjacent to a burner 20. The primary dryer 22 is rotatably mounted in place and positioned at an incline such that the dryer inlet adjacent to the burner 20 is relatively higher than the outlet at the discharge belt 24 to assist in the uniform distribution and transport of the mixture along the length of the dryer. The burner provides the heat for volatilization and combustion by injecting a flame down the center of the dryer. A high power burner may be able to produce a flame delivering as much as 200 million BTUs/hour or more, thereby enabling rapid heating of the soil mixture and internal environment of the dryer. A typical dryer would be 9 feet in diameter by 36 feet in length, available, for example, from Construction Machinery, Inc. (CMI), of Oklahoma City, Okla.

Rotation of the primary dryer 22 permits formation of a uniform mixture of the individual soil components from the feeder bins and facilitates volatilization and combustion of the VOCs. Specifically, as the dryer rotates, a series of L-shaped flights (not shown, also available from CMI) within the dryer catch the components passing along the length of the dryer. The rotation of the dryer and flights creates a "veil" of the mixture which passes across and through the flame from the burner, volatilizing and combusting the VOCs within. The flow of the mixture along the dryer, from the burner to the discharge belt, parallel to the extension of the flame and direction of the flow of exhaust gases is essential to facilitate the chemical reactions which combust the VOCs and thereby rapidly remediate the soil.

For typical soil contaminants as described above, due to the high heat output from the burner and the efficient and thorough mixing achieved in the dryer, within a few seconds, complete combustion of most, if not all, volatile contaminants can be achieved by the process. Residence time in the primary dryer is limited by its throughput capability.

After intimate exposure to the high temperature environment within primary dryer 22, the remediated soil components are removed at discharge belt 24. A high pressure water spray 26 is positioned at the discharge belt 24 to cool the remediated soil to ambient temperatures as it is returned to the environment.

A considerable amount of fines, that is, fine particulate species, is generated as a result of the mixing of the soil components and combustion of the VOCs carried out in primary dryer 22. A majority of the fines are entrained in the hot gases exhausted from the primary dryer 22 to form a gas/fines mixture, although some quantity of fines may be discharged with the remediated soil at the discharge belt 24 from primary dryer 22. Since introduction of these hot gases and fines directly into the environment is objectionable, further treatment is necessary. In particular, VOCs may remain which may be eliminated by combustion. In addition, ultimate disposal of the mixture may be facilitated by separation into a gas phase and a solid phase.

Accordingly, the gas/fines mixture is drawn into a secondary dryer 28. At the same time, a second lot of bulk media is introduced into secondary dryer 28 via weigh belt 30. Secondary dryer 28 is similar to primary dryer 22 in that it is also rotatably mounted and positioned at an incline sufficient such that its inlet end near the primary dryer is higher than its outlet end. Such an orientation encourages mixing and volatilization of any hydrocarbons.

The second lot is directed from a second set of feeder bins 32 onto collecting belt 36, across a second scalping screen 34 to weigh belt 30. The soil stored in the second set of feeder bins 32 may be clean, i.e., remediated soil which has already been processed in the apparatus of the present invention, as described above, or may be other contaminated bulk soil media similar to that loaded into the first set of feeder bins 12 from the Worksite. Whether remediated soil or contaminated bulk material is used depends on the individual and cumulative effects of the level and type of contamination and moisture content of the soil.

The second lot of bulk media of a sufficient amount is introduced into the secondary dryer 28 to cool the gas/fines mixture exhausted from primary dryer 22 to a desired temperature, for example, about 325° F., to facilitate separation. Simultaneously, the bulk media so introduced is preheated with the heat from the hot gas/fines mixture in the secondary dryer and discharged at belt 38. If the second lot of soil from the second set of feeder bins 32 is contaminated, the heat exchange between the gas/fines mixture and the soil may be sufficient to predry the soil and volatilize any VOCs present therein. An igniter (not shown) in the secondary dryer 28 flashes off any VOCs volatilized from the second lot of soil added. As a result, the second lot of soil is remediated upon discharge to the environment at belt 38. A high pressure water spray for the remediated soil is generally not necessary at this point because relatively little heat is generated therein as a result of this step. Alternately, if the second lot is composed of remediated soil, then the process occurring in the secondary dryer is essentially a heat exchange.

In the event that the second lot cannot be fully remediated because its moisture or contaminant level is too high, or because of the nature of the contaminant, the soil discharged from secondary dryer 28 can be returned to primary dryer 22 for additional treatment, e.g., as by a closed conveyor system.

At the outlet of secondary dryer 28, the fines and gases produced form a second gas/fines mixture, with a high concentration of fines, and possibly contain volatilized hydrocarbons which remain to be treated. This gas/fines mixture is drawn from secondary dryer 28 into conduit 41 through damper 40 and high capacity exhaust fan 42. Exhaust fan 42 forces the gas/fines mixture to pass through venturi 44, where the diameter of venturi 44 is less than that of conduits 41 and 45. Typically, a venturi of about 42 inches (dia.) is connected between conduits of 60 inches (dia.). As a result, at venturi 44, the velocity of the gas/fines mixture is increased, reducing the pressure and drawing into conduit 45 ambient air. Conduit 45 leads into a particulate control chamber 46 where at least gross separation of the gas/fines mixture into gaseous phases (removal of at least 75 % of the fines) and a particulate phase is achieved and two of which are, as described in greater detail below, directed back to the primary dryer 22 for further exposure to high temperature in order to combust any remaining VOCs. The third phase is directed to a baghouse 52.

Figure 2:
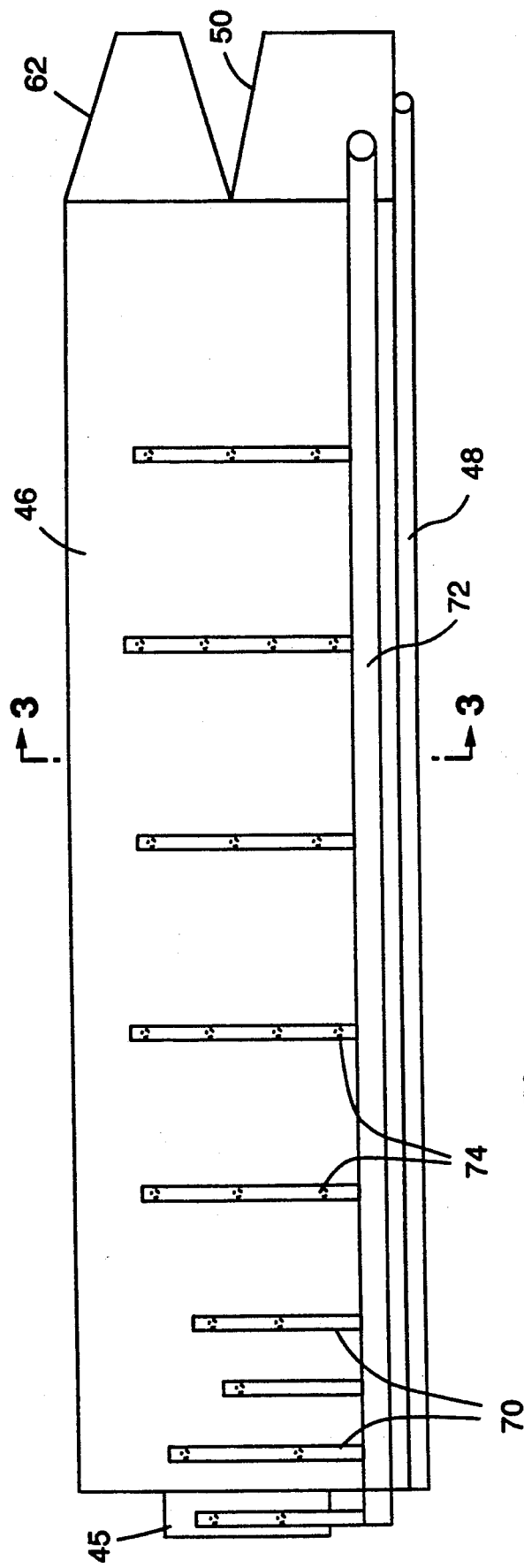
FIG. 2 is a side view of the particulate control chamber of the present invention.
Figure 4:
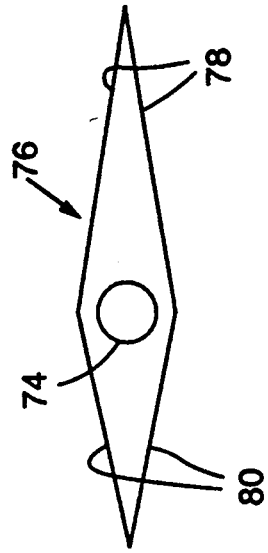
FIG. 4 is an exploded view of the cross section along line 4—4 of one embodiment of an airfoil utilized in the particulate control chamber as shown in FIG. 3.
Figure 3:
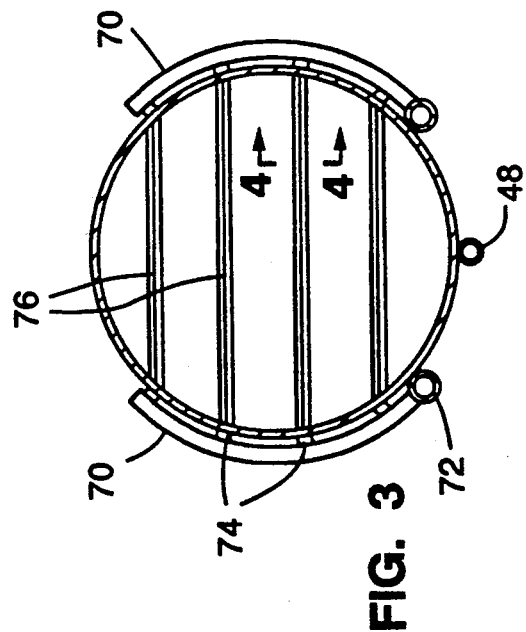
FIG. 3 is a cross sectional view along line 3—3 of the particulate control chamber of the present invention as shown in FIG. 2.

Referring now to FIGS. 2-4, the particular means for achieving the reduction in velocity and separation of the gas/fines mixture through particulate control chamber 46 are illustrated.

FIG. 2 illustrates a preferred detailed description of the particulate control chamber 46, a cylindrical chamber horizontally mounted, with a fines return conduit 48 (6 in. (dia.)). A gaseous return conduit 62 (2 ft. (dia.)), and the fines return conduits 48 and 54 lead back to primary dryer 22. A network of pipes 70, 72 and 74 (4 in., 2 in., and 10 in. (dia.), respectively), as shown in FIG. 3, is mounted externally and circumferentially on the particulate control chamber 46. In a particular embodiment, within particulate control chamber 46 (i.e., along its length, about 40 ft.) is mounted a series of hollow, diamond-shaped airfoils, rows of individual airfoils 76 being aligned across the diameter (typically about 10 ft.) of the particulate control chamber 46. A suitable diamond-shaped airfoil, as illustrated in FIG. 4, measures 4 inches by 18 inches between points.

FIG. 2 also illustrates a particular pattern of staggering of the airfoils in which the number of airfoils varies at several points along the length of particulate control chamber 46. The particular arrangement utilized to stagger the airfoils may be optimized according to the demands of a particular worksite. Further, the specific geometry of the individual airfoils may be varied to optimize conditions necessary to produce laminar flow. For example, surfaces 80 facing conduit 41 at the inlet of the particulate control chamber 46 may be shorter than surfaces 78 facing the outlet of the particulate control chamber 46 at gaseous return conduit 62 and baghouse duct 50. Any such modifications are considered to be within the scope of the present invention.

Cooling and reduction of velocity of the gas/fines mixture is achieved as the gas/fines mixture proceeds over the surfaces 78 and 80 of airfoil 76. Each airfoil 76 may be hollow to allow the passage of a coolant fluid through the interior of airfoil 76 via the network delineated by conduits 70, 72 and 74. A coolant such as liquid nitrogen or water may be pumped therein.

Besides the cooling achieved as the mixture flows over the series of airfoils, surfaces 78 and 80 serve to interrupt the turbulent flow of the gas/fines mixture withdrawn from secondary dryer 28 into the particulate control chamber 46 and thereby help initiate substantially laminar flow of the gas/fines mixture. As a result of the interruption in flow, fines under their own weight fall to and are collected by fines return conduit 48. The length of fines return conduit 48 may be selected such that conduit 48 directs the fines so collected to the primary dryer 22 at a point sufficient to ensure complete combustion of any remaining VOCs.

As most of the fines drop out of the gas/fines mixture, the remaining gases stratify within the particulate control chamber. That is, lighter gases containing uncombusted hydrocarbons and water vapor collect toward the upper part of the chamber and are drawn into gaseous return conduit 62, for recirculation to the primary dryer 22. The hydrocarbons combust in the primary dryer, as described above, contributing to the hot gases and fines produced there. Relatively heavier gases like carbon dioxide collect below the lighter gases to be drawn into baghouse duct 50 and finally to the baghouse 52.

Cooled gases and fines from the particulate control chamber 46 pass into baghouse 52 (84000 cubic feet/min (CFM), also available from Construction Machinery Inc.) where further separation of the fines from the gases is achieved. A portion of the cooled and slowed fines and gases discharged from particulate chamber 46, substantially free of VOCs, are drawn by a high capacity (e.g., 300 hp) exhaust fan 56 through baghouse duct 50 (2 ft. (dia.)) and across a damper 51 into baghouse 52. Two fines return conduits 54 (about 6 in. (dia.)), mounted at the bottom of baghouse 52, collect fines trapped by and falling from the baghouse filters as the fines and gases proceed through baghouse 52. Fines return conduits 54 channel the collected fines back to primary dryer 22, the fines flowing counter to the direction of gases and fines entering the baghouse. Line 55 connected to fines return conduits 54 directs the collected fines into fines return conduit 48 and in turn into primary dryer 22 for additional heating to combust any remaining VOCs. A portion of the clean fines are discharged with the remediated soil at belt 24. Gases free of fines are discharged from baghouse 52 via damper 55 and exhaust fan 56 into a stack 5B. The stack 5B may feature an afterburner 60 in which any remaining traces of VOCs are combusted. The clean cooled gases (e.g., water and carbon dioxide) are vented into the atmosphere at this point.

The remaining portion of gases collected near the top of control chamber may contain traces of VOCs. Vapor return conduit 62 directs this portion back to the inlet of primary dryer 22 near the burner 20 to ensure complete combustion of the VOCs.

There exists the capability for additional control of the process described herein. Feedback from gas and temperature sensors located strategically throughout the apparatus, for example, sensors located along the length of each dryer, facilitates optimization of process parameters for a given soil type. In addition, gas sensors may monitor the contaminant content of soil introduced into the dryers and the contaminant level of the remediated soil, hot gases and fines, and gases vented to the atmosphere. This instrumentation facilitates monitoring of features of the process and apparatus from a central location, for example, by computer control.

The foregoing written specification is considered to be sufficient to enable one skilled in the art to practice the invention. Indeed, various modifications of the above-described modes for carrying out the invention which are obvious to those skilled in the field of hazardous waste management or related fields are intended to be within the scope of the following claims.

What is claimed is:

1. A remediation process for removing volatile organic compounds from soil, comprising the steps of:
   in an apparatus comprising a first rotatable container and a second rotatable container,
   a) heating a first lot of soil in said first container such that organic compounds present therein volatilize and combust, thereby forming a first lot of remediated soil and a first volume of hot gases and fines;
   b) removing said first lot of remediated soil from said first container, transporting said first volume of hot gases and fines to said second container and introducing a second lot of soil to said second container, and contacting said first volume of hot gases and fines with said second lot of soil, said second lot being in an amount sufficient to simultaneously cool said gases and fines in the first volume to a desired temperature while preheating said second lot and forming a second lot of remediated soil;
   c) flashing off the organic compounds present in the second lot, thereby forming remediated soil and a second volume of hot gases and fines;

d) separating said hot gases from said fines in said second volume;

e) reheating said separated gases such that any remaining organic compounds combust;

f) reheating said separated fines such that any remaining organic compounds combust; and g) removing said second lot of remediated soil from said second container.

2. A remediation process for removing volatile organic compounds from soil in an apparatus capable of processing at least about 200 tons per hour of contaminated soil, comprising:

a) introducing a first lot of soil to a first container in said apparatus and heating said first lot of soil in said first container such that organic compounds in said first lot of soil volatilize and combust, thereby forming a first lot of remediated soil and a first volume of hot gases and fines;

b) introducing said first volume of hot gases and fines into a second container;

c) introducing a second lot of soil into said second container sufficient to cool said first volume of hot gases and fines while preheating said second lot of soil;

d) providing a source of ignition in said second container such that organic compounds present flash off, forming a second lot of remediated soil and a second volume of hot gases and fines;

e) separating said second lot of remediated soil from said second volume of hot gases and fines;

f) introducing said gases and a portion of the fines from said second volume to said first container for heating along with said first lot of soil introduced into said first container such that any organic compounds remaining in gases from said second volume combust;

g) introducing fines from said second volume into said first container at a point providing sufficient time for volatilization and combustion of organic compounds remaining in fines from said second volume, simultaneously with the heating of the soil introduced into said first container; and h) removing said first lot of remediated soil from said first container and removing said second lot of remediated soil from said second container.

3. A process according to claim 1 or 2 wherein said second lot comprises contaminated soil.

4. A process according to claim 1 or 2 wherein said second lot comprises remediated soil previously removed from said apparatus.

5. A high capacity, high speed process for treating contained soil, comprising:

a) separating and loading particles of organic contaminated soil particles by size and composition into first and second set of feeder bins;

b) introducing particles from said first set into a first rotatably supported dryer;

c) heating said particles in said first dryer such that organic compounds therein volatilize and combust, forming remediated soil particles and a first volume of hot gases and fines;

d) removing the remediated soil particles from said first dryer;

e) directing said first volume of hot gases and fines to a second rotatably supported dryer;

f) introducing a sufficient amount of particles from said second set of feeder bins into said second dryer to substantially cool said first volume of hot gases and fines to a desired temperature while preheating said particles so introduced;

g) providing a source of ignition in said second dryer sufficient for the flashing off, but not sustained combustion, of organic compounds present in particles therein, forming remediated soil particles and a second volume of hot gases and fines;

h) separating said second volume of gases from said fines of the second volume;

i) introducing said separated gases of the second volume to said first dryer for heating along with particles introduced from said first set of feeder bins such that organic compounds present in said separated gases also combust, forming a third volume of hot gases and fines;

j) introducing said separated fines of the second volume into said first dryer at a point which provides sufficient time for volatilization and combustion of organic compounds remaining in said separated fines, the volatilization and combustion occurring simultaneously with the heating of the said particles introduced from said first set of feeder bins and forming remediated soil and a fourth volume of hot gases and fines;

k) directing said fourth volume of hot gases and fines to said second dryer;

l) contacting said fourth volume of hot gases and the fines with a sufficient amount of particles from said second set of feeder bins such that said hot gases and fines of the fourth volume are cooled to a desired temperature and the particles so contacted are preheated;

m) substantially separating cooled gases of the fourth volume from cooled fines of the fourth volume;

n) discharging said cooled gases to the ambient environment; and o) discharging remediated particles from said dryers.

6. A process according to claim 5 wherein step b further comprises introducing said soil components into a burner end of said first dryer.

7. A process according to claim 5 wherein said soil particles in said second set of feeder bins are contaminated.

8. A process according to claim 5 wherein said soil particles in said second set of feeder bins are remediated.

9. A process according to claim 5 wherein step i further comprises introducing said gases into a burner end of the first dryer.

10. A soil remediation process comprising the steps of:

in an apparatus comprising two generally cylindrically shaped rotary heaters positioned in series with one another, (a) introducing a first lot of contaminated soil to a first end of a first one of said heaters;

(b) rotating said heater and heating said soil as it is transported from said first end to a second end of said first heater to volatilize said contaminants and produce a first lot of remediated soil and a first lot of hot gases and fines;

(c) removing said first lot of remediated soil from a second end of said first heater;

(d) introducing a second lot of soil to a second one of said rotary heaters;

(e) introducing said first lot of gases and fines to said second heater so as to heat said second lot of soil, to cool said first lot of fines and gases and to thereby form a second, cooler, lot of fines and gases;

(f) discharging said second lot of soil from a second end of said second heater; and (g) discharging said second lot of fines and gases to a fines/gas separator.

11. The process of claim 10 wherein said second lot of soil is contaminated soil.

12. The process of claim 10 wherein said second lot of soil comprises previously remediated soil.

* * * * *